Aug. 8, 1967  B. SANDOR  3,334,934
CLOSURE LATCH
Filed Aug. 9, 1965  3 Sheets-Sheet 1
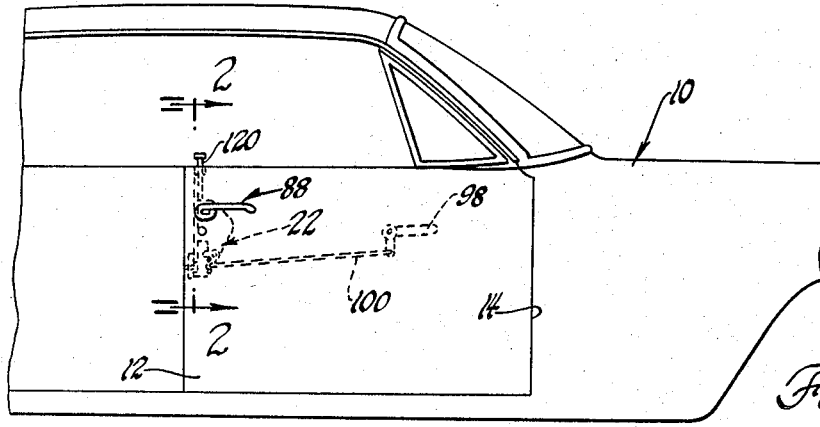
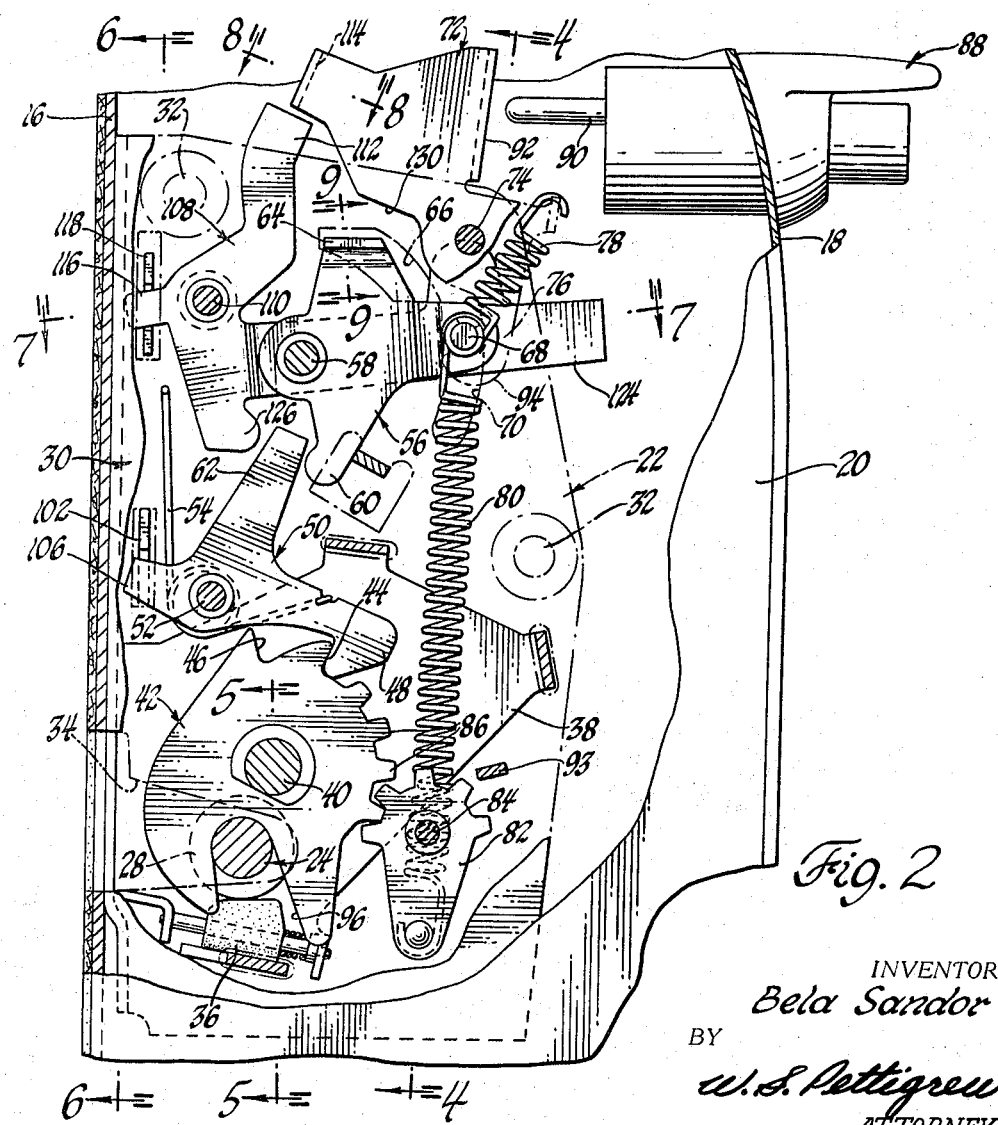
INVENTOR.
Bela Sandor
BY
W.S. Pettigrew
ATTORNEY INVENTOR.
Bela Sandor
BY
W. S. Pettigrew
ATTORNEY

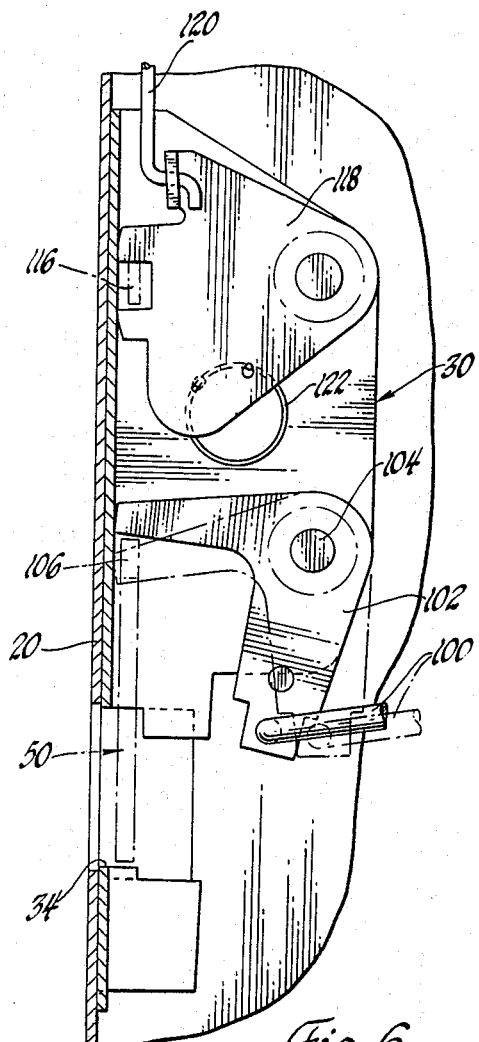
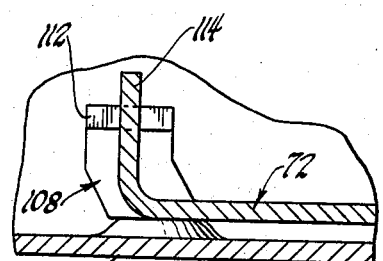
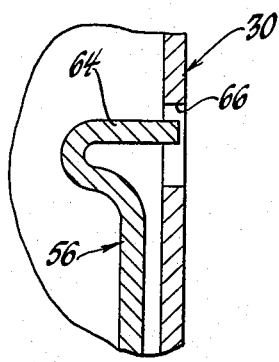
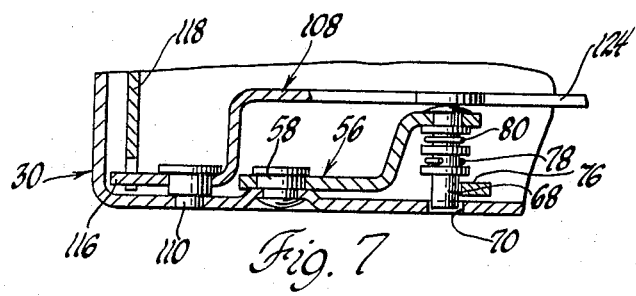
INVENTOR.
Bela Sandor
BY
W. S. Pettigrew
ATTORNEY United States Patent Office 3,334,934
Patented Aug. 8, 1967

3,334,934
CLOSURE LATCH
Bela Sandor, Detroit, Mich., assignor to General Motors Corporation, Detroit, Mich., a corporation of Delaware
Filed Aug. 9, 1965, Ser. No. 478,209
7 Claims. (Cl. 292—216)

ABSTRACT OF THE DISCLOSURE

A vehicle body closure latch includes a latch bolt rotatable between unlatched and latched positions, a detent lever movable between a detenting position holding the latch bolt in latched position and a nondetenting position, and a detent operating assemblage including an operating lever engageable with the detent lever to release the latter from the bolt. The detent operating assemblage further includes energy storage means in the form of a spring or the like connected between the bolt and the detenting operating lever in a manner to be resiliently stressed by rotation of the latch bolt from unlatched to latched position while the operating lever is restrained by a holding lever, such bolt rotation to latched and detented position thus serving to generate and store operating energy in the energy storage spring. The holding lever is selectively manually or otherwise disengageable from the operating lever to permit dissipation of the stored operating energy to cause the operating lever to engage and release the detent lever. Further energy storage means or springs are operative to reengage the holding lever and operating lever after detent release, whereby the energy storage cycle may be repeated during subsequent rotation of the latch bolt to latched position.

---

One feature of this invention is that it provides a new and improved vehicle body closure latch including energy storage means responsive to movement of the closure from open to closed positions to build up operating energy which may be selectively dissipated to unlatch the latch and permit movement of the closure from closed to open position. Another feature of this invention is that such operating energy may be selectively dissipated under but minimum finger pressure on an operating handle or push button operatively connected to the energy storage means, or by some minimum output power-operated means such as a miniature solenoid. A further feature of this invention is that the energy storage means takes the form of a spring connected to the movable latch bolt element of the latch, the spring being deflectable to store operating energy under the force of movement of the bolt from unlatched to latched positions with movement of the closure from open to closed positions. Still another feature of this invention is that it provides a latch according to the foregoing and further including locking means for selectively preventing unlatching of the latch by the energy storage means, and automatic undogging means for moving the locking means out of locked condition upon movement of the closure from open to closed position.

These and other features and advantages of the invention will be readily apparent from the following specification and drawings wherein:

FIGURE 1 is a fragmentary elevational view of a vehicle body including a closure latch according to this invention;

FIGURE 2 is an enlarged partially broken away sectional view taken generally along the plane indicated by line 2—2 of FIGURE 1, and showing the latch in latched condition;

FIGURE 6 is a sectional view taken generally along the plane indicated by line 6—6 of FIGURE 2;

FIGURE 7 is a sectional view taken generally along the plane indicated by line 7—7 of FIGURE 2;

FIGURE 8 is an enlarged sectional view taken generally along the plane indicated by line 8—8 of FIGURE 2; and FIGURE 9 is an enlarged sectional view taken generally along the plane indicated by line 9—9 of FIGURE 2.

Figure 3:
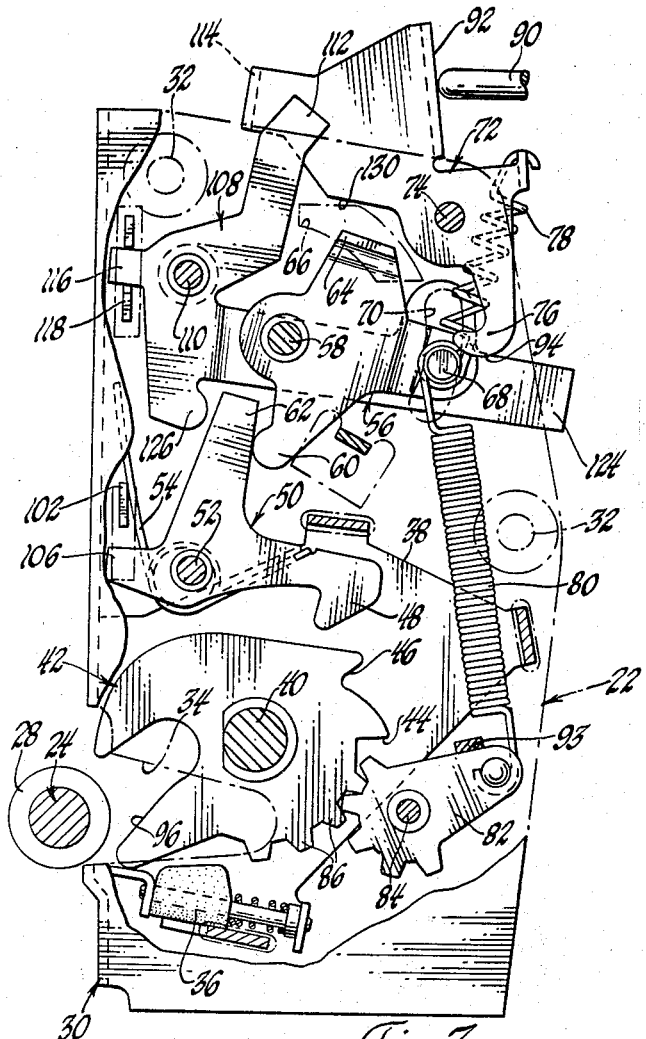
FIGURE 3 is a view similar to FIGURE 2 showing the latch in unlatched condition.

Referring now particularly to FIGURE 1 of the drawings, a vehicle body 10 includes a front door 12 hingedly mounted adjacent its forward edge 14 for swing movement between a closed position as shown and a full open position, not shown. As is conventional, door 12 is fabricated of spaced inner and outer panels 16 and 18, indicated in FIGURE 2, joined adjacent the rearward edge of the door by a transverse jamb panel 20. The door is adapted to be held closed by a closure latch 22 according to this invention.

Figure 5:
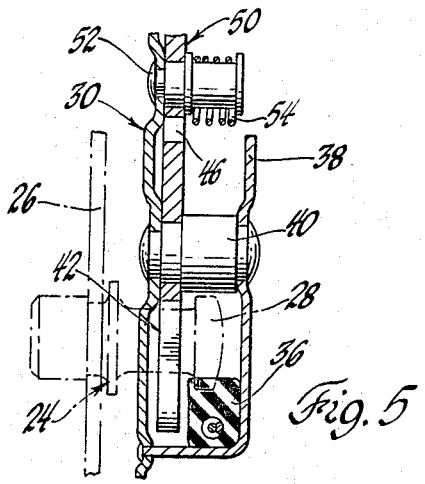
FIGURE 5 is a sectional view taken generally along the plane indicated by line 5—5 of FIGURE 2.

Referring to FIGURE 5, the latch is adapted for cooperation with a pin-type striker element 24 suitably mounted to extend forwardly of the body from a jamb portion 26 of the reinforcing center door pillar of the body. The striker includes a shank terminating in a rounded head 28 of enlarged diameter providing for interlocking cooperation with the latch in a manner later to appear.

Referring to FIGURE 2, latch 22 includes a frame 30 disposed adjacent the intersection of the inner panel 16 and jamb panel 20 and formed of a pair of right angularly related portions bolted thereto, as at locations 32. Both the inner and jamb portions of the frame, as well as the inner panel 16 and jamb panel 20 are cut away to provide a tapered entrance slot 34 indexed for reception of striker 24 during movement of the door from open to closed position. Striker 24 as it initially enters slot 34 is engaged at its head 28 with a slidable dovetail or plastic wedge block 36 which is normally biased longitudinally of its supporting pin by a coil compression spring.

As best seen in FIGURE 5, a supporting plate member 38 spaced from the jamb flange portion of frame 30 includes a number of right angularly bent tongues entered into slots in the frame and bent thereover. A mounting stud 40 headed over at its ends on the frame and the plate includes a journal portion rotatably mounting a forked latch bolt 42. As seen in FIGURES 2 and 3, the bolt is rotatable between a latched position receiving the shank of striker 24 within its bifurcation, and an unlatched position permitting withdrawal of the striker from slot 34. As shown in FIGURE 2, with striker 24 being fully entered into slot 34 and bolt 42 rotated thereover into latched position, the striker is wedgingly engaged between the bolt and wedge block 36 to "dovetail" or vertically align door 12 relative to body 10. Further, the head 28 of the striker is sufficiently larger than the narrow end of slot 34 in the latch frame and the jamb panel that a safety interlock is provided therebetween preventing longitudinal separation of the door from the center pillar as in a collision.

For releasably holding bolt 42 in latched position, a pair of detent shoulders 44 and 46 on the bolt are cooperable with a detent lever 50 pivoted on frame 30 at 52. A torsion spring 54 wrapped about the pivot is anchored at one end to the frame and at its other end to the detent lever to bias the lever into the detenting position shown, wherein a detent foot 48 on the lever engages shoulder 44 to prevent rotation of the bolt from fully latched position. The detent foot 48 is further engageable with the safety shoulder 46 of the bolt in the event of incomplete rotation of the bolt to or from the fully latched position.

Figure 4:
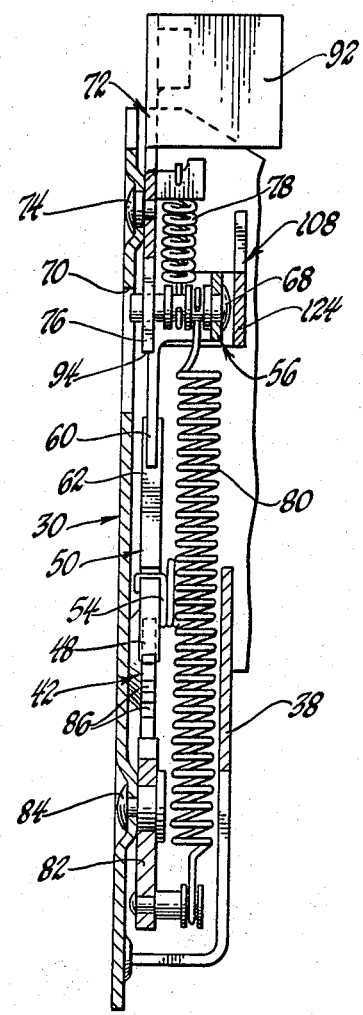
FIGURE 4 is a sectional view taken generally along the line 4—4 of FIGURE 2.

A detent operating lever 56 is pivotally mounted on frame 30 at 58 and includes a foot 60 engageable with an upstanding arm 62 of detent lever 50 to move the detent lever from detenting position upon clockwise rotation of the operating lever. A right angularly bent tab 64 of the operating lever is received within a slot 66 of frame 30 to limit rotation thereof relative to the frame, FIGURE 9. As seen best in FIGURE 4, operating lever 56 carries an elongated pin 68 suitably headed over on the lever and extending therefrom to have its terminal end located in a guide slot 70 of the frame. A push button or holding lever 72 is pivotally mounted on frame 30 at 74 and includes a detent foot 76 adapted to underlie and engage pin 68 when the pin and operating lever 56 are in the raised position shown in FIGURE 2. An extension spring 78 is hooked at one end over pin 68 and at its other end over a lateral tab of the push button lever to bias the push button lever clockwise of frame 30. Pin 68 has further connected thereto one end of an elongated extension spring 80 having its other end hooked over a pin on a gear wheel 82 pivoted on frame 30 at 84. The gear includes a plurality of teeth meshingly engaging a series of teeth 86 formed on bolt 42. By this engagement, the gear is rotatable during rotation of the bolt as between a spring extending position shown in FIGURE 2 and a spring relaxing position shown in FIGURE 3.

As indicated in FIGURE 2, there is provided on door 12 a push button handle 88 or similar outside operating means, the handle including a shiftable plunger 90 engageable upon inward movement thereof with a right-angular flange 92 on push button lever 72. Assuming now that door 12 is initially located in closed position, it is seen that the bolt 42 is held in latched position by the detent lever, that the operating lever 56 and pin 68 are located in raised position and held therein by the detent foot 76 of the push button lever, and that the gear 82 has been rotated to its position wherein spring 80 has undergone substantial deflection and stress against the reaction provided by detent foot 76. To unlatch, plunger 90 of handle 88 is pushed inwardly but a short distance to engage flange 92 and rotate the push button lever 72 slightly counterclockwise to release detent foot 76 from engagement with pin 68. The angle of tangential engagement between the pin and the detent foot may be adjusted as desired, but the area of contact and friction therebetween is quite low, even under the stress of spring 80 and thus only minimum force is required through the plunger 90 to rotate the push button lever. Upon release of the detent foot 76, spring 80 is permitted to relax and pull pin 68 downwardly in slot 70 and rotate the operating lever 56 clockwise into engagement with arm 62 of the detent lever. The rate of spring 80 is so selected that when extended it has ample force for rotating the operating lever with sufficient force to engage and rotate the detent lever 50 out of engagement with bolt 42 against the action of spring 54. In actual practice in most current automobiles, the conventional compressible seal strips around the perimeter of door 12 are sufficiently compressed by the door when closed that they become operative once bolt 42 is released to force door 12 outwardly from closed position to a partially open position indicated in FIGURE 3. Of course, in the absence of such a seal strip, suitable spring means may be provided on bolt 42 to rotate the same to unlatched position. At any rate, in this position of the bolt, striker 24 is free to withdraw from slot 34 and the door may be moved to a desired open position.

Referring now to FIGURE 3, the latch parts are shown in their respective positions occurring immediately after full rotation of bolt 42 to unlatched position. It is appreciated that just prior to this position, spring 80 has relaxed to the extent that it has overcome the action of springs 54 and 78 to rotate the operating lever and detent lever to the positions shown, and that it has stretched spring 78 generally to the extended position shown in FIGURE 3. This operation occurs just prior to rotation of the bolt to unlatched position. The subsequent rotation of the bolt further relaxes the spring 80 and moves it somewhat bodily upwardly through the counterclockwise rotation of gear 82 to the position shown against a stop 93. In this momentary condition of the latch parts, spring 54 and spring 78 come into effect; that is, these two springs are immediately operable to rotate operating lever 56 counterclockwise and to shift pin 68 upwardly in slot 70 and back to the raised position shown in FIGURE 2. A curved cam edge 94 on the bottom of detent foot 76 is accordingly engaged by the pin to rotate push button lever 72 counterclockwise until the pin moves above the foot, whereupon spring 80 further relaxes for final rotation of the push button lever engaging the detent foot under the pin. The parts are thereupon readied for a repeated unlatching sequence when door 12 has been returned to closed position. In the final closing movement of the door from the position shown in FIGURE 3, a shoulder 96 on the bolt engages the shank of striker 28 inducing counterclockwise rotation of the bolt to the latched position thereof wherein detent foot 48 engages detent shoulder 44, and clockwise rotation of gear 82 back to the position of FIGURE 2. Such rotation stretches spring 80 against the reaction of detent foot 76 on pin 68.

For releasing the latch from inside the vehicle body, an inside door handle assembly 98 indicated in FIGURE 1 is connected through a conventional draft link 100 to one leg of an inside remote lever 102 pivoted on the inward flange of frame 30 at 104, FIGURE 6. The other leg of lever 102 overlies a leg 106 of detent lever 50 when the detent lever is in detented position, FIGURE 2. Operation of the inside handle causes counterclockwise rotation of lever 102 and consequent counterclockwise rotation of the detent out of engagement with bolt 42.

Locking means for selectively preventing release of the latch by the outside handle 88 includes a blocking lever 108 pivoted on frame 30 at 110 and including a blocking leg 112 extending upwardly from the pivot to lie adjacent a right angularly bent flange 114 of push button lever 72, FIGURE 8. Lever 108 is movable between a blocking position as shown in FIGURES 2 and 8, wherein leg 112 underlies flange 114 to prevent rotation of the push button lever by plunger 90, and a nonblocking position, shown in FIGURE 3, shifted out of the way of any engagement with flange 114 to allow for rotation of the push button lever. As seen in FIGURE 6, a leg 116 of the blocking lever is embraced by a bifurcation of an actuating lever 118 pivoted on the inner flange of frame 30 and operably connected to suitable garnish molding actuating button means 120 on the inside of the vehicle, indicated in FIGURE 1. The garnish button means are manually operable to selectively locate the blocking lever in either position thereof, and an overcenter spring 122 holds the actuating lever 118 and the blocking lever in either selected position. The blocking lever includes a further leg 124 adapted for operative connection with a conventional lock cylinder actuator mounted on the exterior of outer panel 18, thereby to provide for outside selection of the position of the blocking lever.

The latch further includes automatic undogging means in the form of a foot 126 on blocking lever 108 engageable by an arm 62 of detent lever 50. Assuming that the door 12 has been moved to open position and that the operator, either by the garnish button 120 or the outside lock cylinder, has inadvertently rotated the blocking lever to the blocking position thereof, the subsequent movement of the door to closed position and consequent rotation of bolt 42 to the latched position of FIGURE 2 causes the detent foot 48 to ride over shoulders 44 and 46 of the bolt thereby to rotate the detent lever counterclockwise. Arm 62 accordingly engages the blocking lever and moves it to its unlocked position, FIGURE 2. The operator is thus not locked out of the vehicle, but must rather use the outside lock cylinder means to return the blocking lever to blocking position in a normal manner.

It is to be noted that in the event of breakage or other failure of spring 80 for some reason, preventing release of the latch in a normal manner, the latch may still be released by outside handle 88, as well as inside handle 102. Push button lever 72 is provided with an actuating edge 130 engageable with tab 64 of the operating lever 56 for rotation thereof to release the detent lever. For this fail-safe operation, slightly more inward travel is required of plunger 90 than is the case with normal release by spring 80.

It is apparent that the closure latch of this invention provides improved means for releasing the latch from latched condition through the provision of a spring or other energy storage means responsive to the mere movement of the door from open to closed position, together with means for selectively releasing the energy of the spring means to operate the detent 50. It is further apparent that only a minimum of force and travel is required at the plunger 90 or equivalent releasing means to effect such release of the spring energy, amounting to what may be termed "trigger action." If desired, the manual plunger 90 may be replaced by some power operated element, such as a solenoid having its armature directly operable upon the flange 92 of the push button lever and responsive to a mere closing of a switch by inward depression of the push button of handle 88. Such a solenoid need be of only minimum force rating, and thus of minimum size and cost.

Having thus described my invention, what is claimed is:

1. In combination with a vehicle body including a closure movable between open and closed positions, a closure latch comprising, latch means movable between latched and unlatched positions, detent means for holding said latch means in the latched position thereof, detent operating means operable to release said detent means from said latch means, means operably connected between said latch means and said operating means for storing energy upon movement of said latch means from the unlatched to the latched position thereof and for applying said stored energy to said operating means to cause the latter to release said detent means, means for holding said operating means against the force of the stored energy, and means for selectively releasing said holding means to permit dissipation of the energy of said storage means causing said operating means to release said detent means.

2. A closure latch as recited in claim 1 and including further means for storing energy during release of said operating means and for dissipating said energy to return said operating means and said holding means into holding relation.

3. A closure latch as recited in claim 1 wherein said energy storage means includes a spring connected between said latch means and said operating means.

4. A vehicle body closure latch as recited in claim 1 and further including locking means movable between a locked position preventing release of said holding means and an unlocked position, and automatic undogging means responsive to movement of said latch means from the unlatched to the latched position thereof for moving said locking means from the locked to the unlocked position thereof.

5. In a vehicle body including a closure movable between open and closed positions, a vehicle body closure latch comprising, in combination, a latch bolt movable between latched and unlatched positions relative to striker means on said body, a detent lever for holding said bolt in the latched position thereof, a detent operating member engageable with said detent lever to release said detent lever from said bolt, an energy storage spring connected between said latch bolt and said operating member, said spring being deflectable to store operating energy therein upon movement of said latch bolt from the unlatched to the latched position thereof, a holding member for holding said operating member against the force of the stored operating energy in said spring, means for selectively moving said holding member out of holding relation with said operating member to permit dissipation of the stored operating energy causing said operating member to engage and release said detent lever, and means on said holding member and said operating member engageable in the event of failure of said spring for release of said detent lever.

6. A closure latch as recited in claim 5 and further including a second spring connected to said operating member and responsive to detent releasing movement thereof for storing operating energy operative to return said operating member and said holding member into holding relation.

7. A closure latch as recited in claim 5 and further including locking means movable between a locking position preventing movement of said holding member and an unlocked position, and automatic undogging means responsive to movement of said latch bolt from the unlatched to the latched position thereof for moving said locking means from the locked to the unlocked position thereof.

References Cited

UNITED STATES PATENTS

| | | | |
|---|---|---|---|
| 2,203,845 | 6/1940 | Sletten | 292—336 |
| 2,634,147 | 4/1953 | Robertson | 292—229 X |
| 2,814,193 | 11/1957 | Roethel | 292—229 X |
| 3,236,551 | 2/1966 | Nash | 292—216 X |

MARVIN A. CHAMPION, *Primary Examiner.*

R. E. MOORE, *Assistant Examiner.*